June 30, 1925.  
DE WANE B. SMITH  
SPRAYER  
Filed Dec. 9, 1921
1,544,490
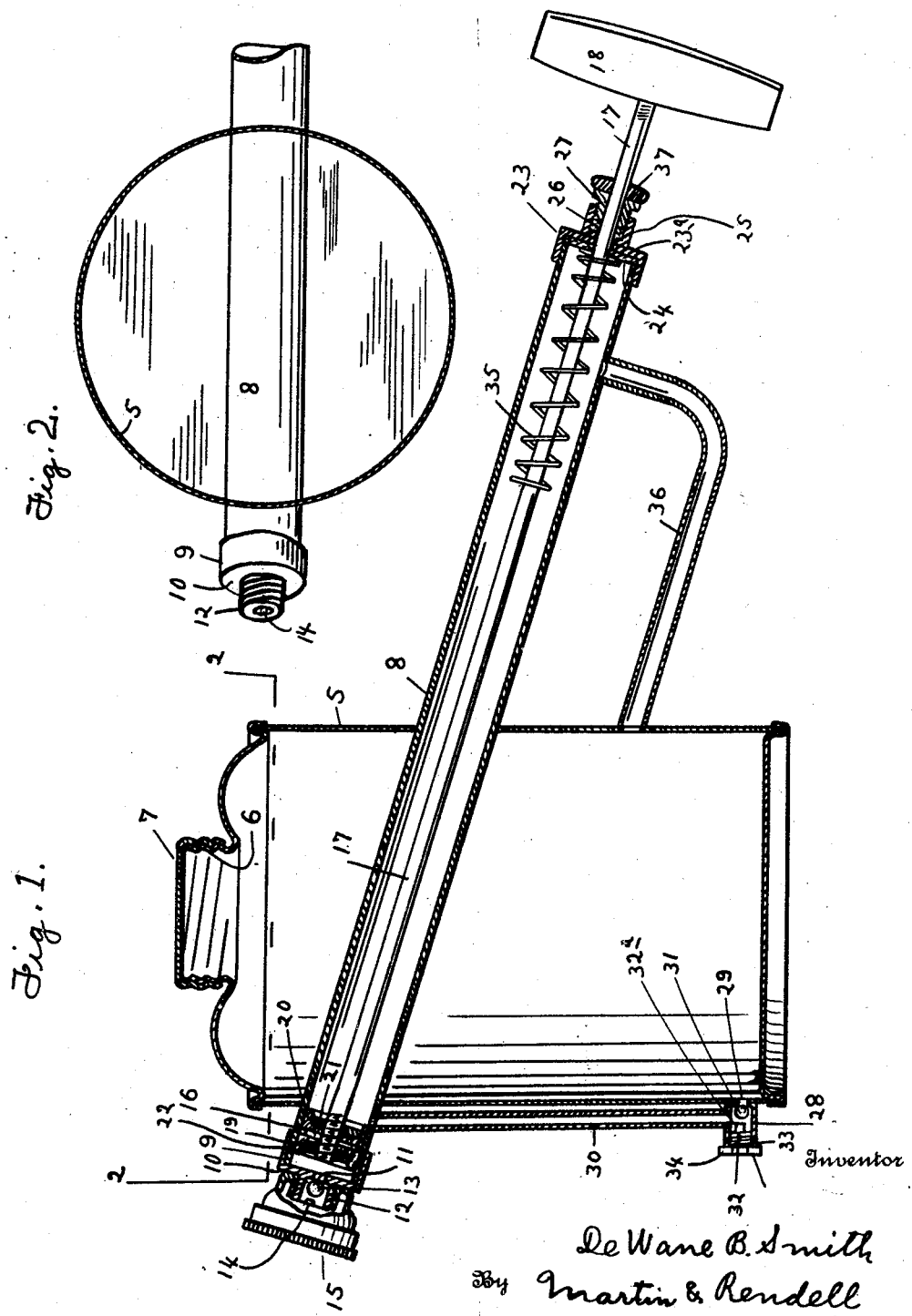

Patented June 30, 1925.

1,544,490

UNITED STATES PATENT OFFICE.

DE WANE B. SMITH, OF UTICA, NEW YORK; GOLDEN R. SMITH, MYRON H. SMITH, ALFRED P. SMITH, AND JESSIE A. RICHARDS, EXECUTORS OF SAID DE WANE B. SMITH, DECEASED, ASSIGNORS TO D. B. SMITH & COMPANY, INC., OF UTICA, NEW YORK, A CORPORATION.

SPRAYER.

Application filed December 9, 1921. Serial No. 521,120.

*To all whom it may concern:*

Be it known that I, DE WANE B. SMITH, a citizen of the United States, and a resident of Utica, in the county of Oneida and State of New York, have invented certain new and useful Improvements in Sprayers; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to sprayers of the hand-operated portable type.

The purpose of my invention is to provide a new and improved form of portable hand-operated sprayer.

A further purpose is to provide a sprayer of the type described which is strong and durable in construction, readily operated with precision and not liable to become clogged.

A further purpose is to provide a sprayer of the class described so constructed that its parts may be readily taken apart and reassembled again when needed for thoroughly cleaning the cylinder, piston, passages and valves.

Another object of my invention is to provide a sprayer where the pump cylinder is not only secured to but extends through the upper part of the liquid receptacle providing a strong and compact device and one which is readily held in the hand and naturally balances itself in the hand and facilitates accurate direction of the spray from the device upon the object being sprayed.

A still further purpose is to provide a sprayer of the class described having a return pipe leading from the rear end of the pump cylinder back to the receptacle below the cylinder and further to have said return pipe form a loop around or below the operator's hand so that the operator's hand is prevented from slipping rearwardly from its usual position upon the cylinder.

Further purposes and advantages of my invention will appear from the specification and claims herein.

Fig. 1 is a central vertical sectional view through a sprayer embodying my invention.

Fig. 2 is a horizontal sectional view on line 2—2 of Fig. 1 with the spray nozzle removed from the forward outlet of the cylinder and with the rear end of the cylinder and its parts at that end cut off.

Referring to the drawings in a more particular description it will be seen that the device comprises a liquid receptacle 5 preferably cylindrical in form and conveniently formed of sheet metal in the top of which there is provided an upwardly extended screw-threaded filling opening 6 to which is removably secured the screw-threaded filler cap 7 of any preferred form.

Rigidly secured to the upper part of the receptacle 5 and preferably as shown in the drawings by means of its extending through the opposite sides of the said receptacle 5 there is provided the pump cylinder 8 preferably formed of brass tubing. This cylinder is secured by liquid-tight joints to the opposite sides of the receptacle 5 and at about the angle indicated in the drawings so that the forward end of the cylinder projects a short distance through the left hand side of the receptacle 5 close to the top of the receptacle while at the other side of the receptacle the cylinder passes out some distance down from the top. Approximately half of the length of the cylinder is outside of and to the rear of the receptacle 5. This rearward part of the pump cylinder is the part grasped by the hand of the operator when the device is being carried or operated.

To the forward end of the cylinder 8 is secured preferably by screw-threading a cap 9 in the diaphragm or plate portion 10 of which is a relatively small outlet 11. Surrounding this opening there projects forward from the plate 10 of the cap 9 a short exteriorly screw-threaded pipe portion 12 in which is located the movable part of the check valve preferably composed as shown of a ball 13 seating back against the outlet opening 11. Within the forward end of the short pipe or nipple piece 12 is located a small cross bar 14 to prevent the ball 13 from coming out of the nipple 12. Preferably this cross bar 14 is removably held in place as by being sprung into place allowing the cross bar to be removed and the ball to be then removed for re-placement or cleaning if desired. If desired a spray nozzle 15 of any desired form may be attached to the nipple 12. One form of spray nozzle is shown attached to my device but as the detail construction of the spray nozzle is not material to my invention further description thereof is not necessary.

Reciprocatingly mounted in the pump cylinder 8 there is provided the piston 16 secured to the forward end of the piston rod 17 the rear end of which projects out through the rear end of the cylinder and is there provided with a handle 18. The piston may conveniently be constructed of two oppositely cupped washers 19 and 20 of leather or other suitable material held in place between two smaller discs 21 at the rear and 22 at the front. The forward disc is screw-threaded to the forward end of the piston rod so as to afford means for mounting and readily replacing the leather washers.

At the rear end of the cylinder there is provided a closure cap 23 screw-threaded onto the rear end of the washer and holding a packing disc 24 between the diaphragm 23ᵃ of the washer and the rear edge of the cylinder. The cap 23 is provided with a central opening through which extends the piston rod 17. To the rear of the diaphragm portion 23ᵃ the cap is extended in cup-shaped form to provide a packing gland 25 wherein is located the packing 26 held in place by packing nut 27 screw-threaded into the gland 25.

At the forward side of the receptacle near its bottom a short tube 28 extends outwardly surrounding a smaller hole 29 formed in the side of the receptacle. From the top of this pipe 28 and connected therewith extends close to the outer side of the receptacle the pipe 30 leading to and connected with the lower side of the cylinder 8 near its forward end. In the pipe 28 is placed a valve ball 31 adapted to seat against and close the opening 29 or to move from the opening 29 and let liquid pass from the receptacle 5 through pipes 28 and 30. The outer end of pipe 28 is normally closed by a plug 32 screw-threaded into the outer end of said pipe and preferably holding a washer 33 between the head 34 of said plug and the extremity of said pipe.

Preferably the inner end of plug 32 is provided with an extension 32ᵃ of smaller diameter than the plug and operating to limit the forward motion of the valve ball 31.

In order to cushion the end of the rearward motion of the piston a coil spring 35 may be placed about the piston rod 17 which will yield as the piston is brought back thereagainst.

Secured to the lower side of the cylinder 8 and near its rear end and connecting with said cylinder is a return pipe 36 which extends down from the cylinder a short distance and then is bent preferably on a curve and then extended forward to the adjacent rear side of the receptacle 5 below the cylinder and towards the bottom of the receptacle. This return pipe forms a passage for the return into the receptacle 5 of any liquid which has worked its way by or to the rear of the piston. In the ordinary operation the user will hold the device in his left hand with said hand grasping the exposed rearward half of the cylinder 8. The return pipe 36 forms a loop around and below the operator's hand whereby the device is more readily held in the hand and the hand is kept from accidentally slipping rearwardly from its grasp upon the cylinder.

A short distance from the handle 18 there is securely fastened to the piston rod 17 a collar 37 adapted to engage the rear of the packing nut 27 and so prevent the piston from being forced too far forward in the pump cylinder 8.

What I claim as new and desire to secure by Letters Patent is:

1. In a sprayer the combination of a liquid receptacle having a filler opening with a removable cap, a pump cylinder extending through and secured to the upper part of the receptacle and having a relatively small outlet at its forward end forming a valve seat, the rear end of said pump cylinder extending a substantial distance rearwardly of said receptacle and forming the handle of the device, a check valve seating rearwardly on said seat of the forward outlet, a piston reciprocatingly mounted in said pump cylinder, a piston rod having its forward end fastened to the piston and extending out from the rear end of the cylinder, a handle on the rear end of the piston rod, a rear closure for the cylinder having an aperture guiding and fitting the piston rod, a feed pipe connecting the forward part of the cylinder with the lower part of the receptacle and a rearwardly seating check valve in said feed pipe.

2. In a sprayer the combination of a liquid receptacle, a pump cylinder extending through and secured to the upper part of the receptacle and having a relatively small outlet at its forward end forming a valve seat, a check valve seating rearwardly on said seat of the forward outlet, a piston reciprocatingly mounted in said pump cylinder, a piston rod having its forward end fastened to the piston and extending out from the rear end of the cylinder, a handle on the rear end of the piston rod, a rear closure for the cylinder having an aperture guiding and fitting the piston rod, a feed pipe outside the receptacle and connecting the forward part of the cylinder with the lower part of the receptacle, a rearwardly seating check valve in said feed pipe, and a removable clean-out cap on said feed pipe opposite the check valve therein.

3. In a sprayer the combination of a liquid receptacle, a pump cylinder secured directly to the upper part of the receptacle and extending a substantial distance rearwardly of the receptacle and forming a handle for the device and having a relatively small outlet at its forward end forming a valve seat, a check valve seating rearwardly on said seat of the forward outlet, a piston reciprocatingly mounted in said pump cylinder, a piston rod having its forward end fastened to the piston and extending out from the rear end of the cylinder, a handle on the rear end of the piston rod, a rear closure for the cylinder having an aperture guiding and fitting the piston rod, a feed pipe connecting the forward part of the cylinder with the lower part of the receptacle, a rearwardly seating check valve in said feed pipe, and a return pipe connecting the rearward part of the cylinder with the receptacle.

4. In a sprayer the combination of a liquid receptacle, a pump cylinder secured to the upper part of the receptacle and extending a substantial distance rearwardly of the receptacle and forming a handle for the device and having a relatively small outlet at its forward end forming a valve seat, a check valve seating rearwardly on said seat of the forward outlet, a piston reciprocatingly mounted in said pump cylinder, a piston rod having its forward end fastened to the piston and extending out from the rear end of the cylinder, a handle on the rear end of the piston rod, a rear closure for the cylinder having an aperture guiding and fitting the piston rod, a feed pipe connecting the forward part of the cylinder with the lower part of the receptacle, a rearwardly seating check valve in said feed pipe and a return pipe below the pump cylinder and connecting the rearward part of the cylinder with the receptacle and forming a loop to hold the operator's hand from slipping rearwardly from the rear part of the cylinder.

In witness whereof I have affixed my signature this 30th day of November, 1921.

DE WANE B. SMITH.